Feb. 22, 1955  F. B. SHEPARD  2,702,637
FILTERING UNIT
Original Filed June 9, 1949  2 Sheets-Sheet 1
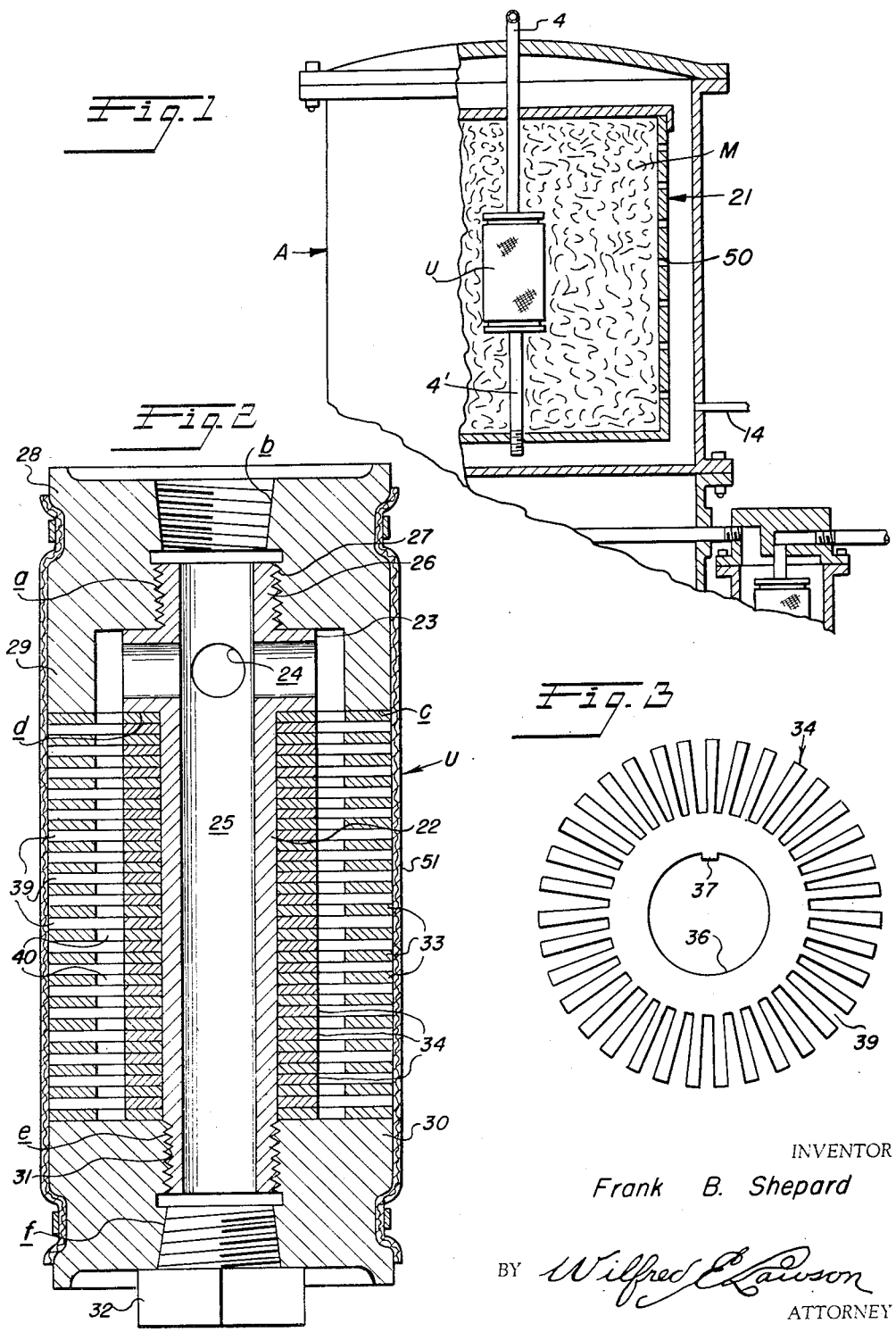
INVENTOR
Frank B. Shepard
BY Wilfred E. Lawson
ATTORNEY Feb. 22, 1955 F. B. SHEPARD 2,702,637
FILTERING UNIT
Original Filed June 9, 1949 2 Sheets-Sheet 2
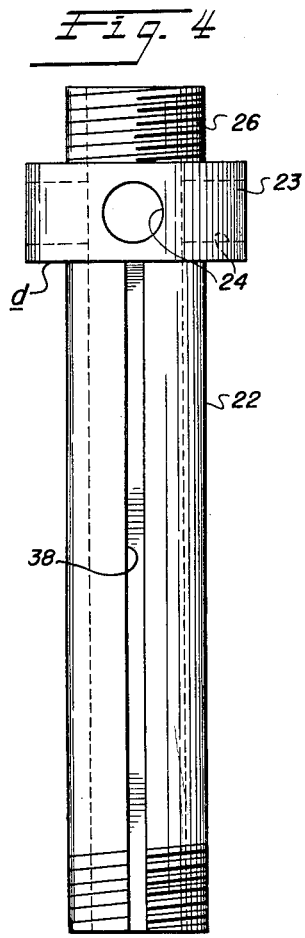
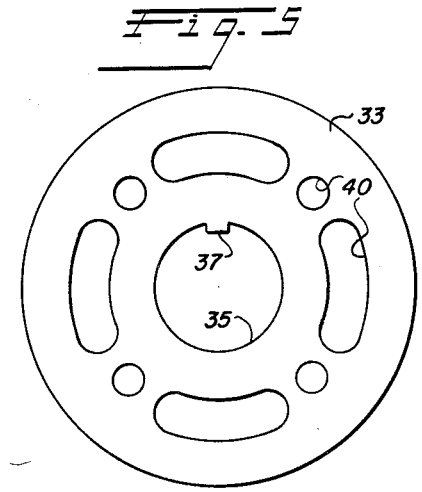
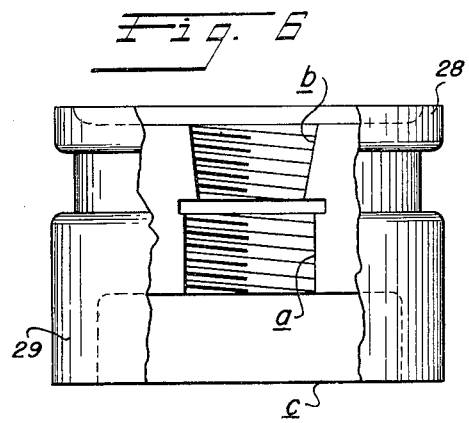
INVENTOR
Frank B. Shepard
BY *Wilfred E. Lawson*
ATTORNEY

United States Patent Office 2,702,637
Patented Feb. 22, 1955

2,702,637

FILTERING UNIT

Frank B. Shepard, Texon, Tex.

Original application June 9, 1949, Serial No. 98,026. Divided and this application April 18, 1950, Serial No. 156,673

1 Claim. (Cl. 210—169)

This invention relates to a filtering unit and has relation more particularly to a unit of this kind designed for use though not necessarily so restricted, in a filtering system for reclaiming or purifying lubricating and cutting oils such as comprised in pending application Serial No. 98,026 filed June 9, 1949, now abandoned, and of which the present application is a division.

A further object of the invention is to provide an improved filtering unit wherein a plurality of disc-like members are disposed one upon the other and are maintained firmly in assembled relation in a novel manner upon a tubular core into which the fluid to be filtered is introduced, the fluid passing into the core through capillary passages formed between the opposing or contacting faces of the discs.

The invention consists in the details of construction and in the combination and arrangement of the several parts of my improved filtering unit whereby certain advantages are attained, as will be hereinafter more fully set forth.

In order that my invention may be better understood, I will now proceed to describe the same with reference to the accompanying drawings, wherein:

Figure 1 is a fragmentary view partly in section and partly in elevation of a filtering apparatus including a filtering unit constructed in accordance with an embodiment of the invention;

Figure 2 is an enlarged view in longitudinal section through a filtering element as herein comprised and unapplied;

Figure 3 is a view in top plan of one of the discs comprised in the filtering unit removed;

Figure 4 is an enlarged elevational view of the supporting tube of the filtering unit unapplied;

Figure 5 is a view of top plan of a second type of disc comprised in the filtering unit; and Figure 6 is an enlarged view partly in elevation and partly in section of a head as comprised in the filtering unit.

As illustrated in the accompanying drawings, the filtering unit comprises a tubular member 22 provided a distance inwardly of its upper end with a surrounding collar 23 provided at spaced points therearound with the radial ports 24 in communication with the bore 25 of the member 22.

The portion or neck 26 above the collar 23 is externally threaded for engagement within the lower straight portions $a$ of the central opening 27 of the top retaining ring or head 28. The upper portion $b$ of the opening 27 is provided with a pipe thread in which is engaged the lower extremity of the depending line 4.

The outer marginal portion of the ring or head 28 has a depending and surrounding skirt 29, the free edge face $c$ of which is substantially coplanar with the inner face $d$ of the collar 23.

Associated with the lower portion of the member 22 is a second retaining ring or head 30. The upper portion $e$ of the bore 31 is straight and threads upon the lower portion of the member or supporting tube 22. The lower portion of the bore 31 is provided with a pipe thread to permit the coupling thereto of a pipe line section where desired but in the present instance this portion $f$ receives a sealing plug 32.

Arranged between the applied rings or heads 28 and 30 are the alternately arranged screening discs 33 and 34. These discs 33 and 34 are of substantially the same radius and are provided with the axial openings 35 and 36, respectively, to permit the discs to be snugly fitted upon the tubular member 22. Each of these discs 33 and 34 are each provided with an inwardly directed lug or key 37 which is received in a keyway or groove 38 in the periphery of the member 22 disposed lengthwise thereof whereby the discs 33 and 34 are held in desired relative assembly and against rotation around the member 22.

The discs 33 and 34 are of desired number and alternately arranged in a stack with disc 33, preferably at the top and bottom of the stack.

The discs 34 are provided in their marginal portions with the elongated slots 39 which in an assembled stack or unit, provide channels open at their outer ends and having their inner extremities in communication with the openings 40 in the discs 33. These openings 40 may be circular or elongated and arcuate and it is to be noted that adjacent openings are not spaced apart a distance greater than the width between adjacent slots 39. It is also to be noted that location of the lugs or keys 37 of the discs 33 and 34 are preferably such that when said discs are assembled in stack upon the member 22 the spaces between adjacent openings 40 in the discs 33 will offer no obstruction to the communications between any of the slots 39 and the openings 40.

Due to the varying grades of oil as determined by viscosity, temperature, rate of flow and for pressure, it is necessary and important that the discs 33 and 34 be capable of ready assembly and separation so that the discs 33 and 34 may be employed of varying thickness or discs 34 may be used with slots of selected sizes or discs 33 employ openings of predetermined size so that the stack may be arranged and adjusted to meet the various conditions and fitted to the individual characteristics of the medium to be filtered. This adjustment can be further accomplished, when necessary, by employing more discs 33 than discs 34 or vice versa.

The unit also includes an embracing filtering lamination 51, such as dense felt, paper and other delicate fabrics. The discs 33 and 34 of a unit assures a substantial high pressure and rupture proof element and it is to be understood that the filtering lamination 51 can be omitted when a unit is used in a waste packed filter, such as the unit U.

The lamination 51 prevents any possibility of fuller's earth or the like being present in the filtered liquid. While in the accompanying drawing, the lamination is shown only as a single layer, it may be of multiple layers as the requirements of practice may determine.

In the use of this filtering unit, it is to be embedded within the filtering material M, contained in the cage 21, in the same manner as is the unit U, as shown in Figure 2 of the drawings of record in my aforesaid copending application, which cage is centered within the closed tank A, so that the liquid entering the inlet 14 fills the tank and passes inwardly through the perforations 50 in the side wall of the cage, the material M, the lamination 51 and the slots 39, of the discs 36, from whence it passes upwardly through the openings 40, in the discs 33 and inwardly of the ports 24. From the ports 24, the filtered liquid passes upwardly through the head 28 and the outlet pipe 4. In lieu of the closure plug 32, a length of pipe 4' may be substituted, in which case, it will depend from the bottom of the unit, through the bottom of the cage 21, and into the space beneath the latter. Here, a portion of the liquid will pass from the tank A and upwardly of the pipe 4' and the member 22, so as to create a suction at the ports 24 and thus augment the flow of the filtered liquid through the cage and the unit.

From the foregoing description it is thought to be obvious that a filtering unit constructed in accordance with my invention is particularly well adapted for use by reason of the convenience and facility with which it may be assembled and operated.

I claim:

In a filtering unit, a vertical tubular member, a cylindrical enlargement formed exteriorly of and inwardly from the top end of said member and having lateral ports opening outwardly therethrough, the end of said member above said enlargement being screw-threaded, a cylindrical head engaged on the screw-threaded end of said member and having a depending skirt spacedly encircling said enlargement, said head having an axial screw-threaded opening for the connection of a discharge line therewith for the filtered liquid passing upward through the unit, a plurality of alternately disposed discs surrounding said member below said enlargement and having a diameter equal to that of said head, one set of said discs having a circular series of openings in the same and aligned with each other and with the space between said enlargement and said skirt, the other set of discs having a series of radial slots opening through the outer edges thereof, a second cylindrical head in screw-threaded connection with the lower end of said member and abutting against the lowermost of said discs, said second head having an axial screw-threaded opening, a filtering lamination encircling the unit and secured at its ends to said heads and a liquid inlet pipe depending from the axial opening in said second head for directing a portion of the unfiltered liquid upwardly of said tubular member so that it will create a suction at the ports to augment the inflow of the filtered liquid to the lamination and said slots.

References Cited in the file of this patent

UNITED STATES PATENTS

| | | |
|---|---|---|
| 1,641,485 | Heftler | Sept. 6, 1927 |
| 1,976,547 | Dumas | Oct. 9, 1934 |
| 1,977,174 | Crawford | Oct. 16, 1934 |
| 2,141,436 | Harris | Dec. 27, 1938 |
| 1,184,243 | Belyavin | Dec. 19, 1939 |
| 2,335,532 | Ream | Nov. 30, 1943 |
| 2,354,380 | Kasten | July 25, 1944 |
| 2,365,525 | Cox | Dec. 19, 1944 |
| 2,369,857 | Russell | Feb. 20, 1945 |
| 2,418,604 | Shepard | Apr. 8, 1947 |
| 2,455,486 | Hicks | Dec. 7, 1948 |

FOREIGN PATENTS

| | | |
|---|---|---|
| 107,090 | Great Britain | June 21, 1917 |
| 469,152 | Great Britain | July 20, 1937 |
| 530,116 | Great Britain | Dec. 5, 1940 |